Patented Dec. 1, 1925.

1,563,971

UNITED STATES PATENT OFFICE.

WILLIAM B. FENN, OF PORT WASHINGTON, NEW YORK, ASSIGNOR TO MARGARET F. FENN, OF PORT WASHINGTON, NEW YORK.

PROCESS OF STERILIZING CANNED FOODS.

No Drawing. Application filed May 26, 1923. Serial No. 641,752.

*To all whom it may concern:*

Be it known that I, WILLIAM B. FENN, a citizen of the United States, residing at Port Washington, county of Nassau, and State of New York, have made a certain new and useful Invention in Process of Sterilizing Canned Foods, of which the following is a specification.

This invention relates to a process of sterilizing canned foods and more particularly to an improvement on such a process as is described in my prior Patents Nos. 1,365,673, granted January 18, 1921, and 1,378,531, granted May 17, 1921, and has for its object the provision of a step in the process therein set forth which I have found to be of great advantage for use in connection with such process.

The object of the invention is to provide an additional step in the process of preserving canned goods and which is preferably employed as one of the initial steps in the process.

A further object of the invention is to produce a partial vacuum in a container filled with the goods to be sterilized, prior to the sterilizing process, to especially aid the sterilizing process in either decreasing the time of processing, effecting more perfect sterilization, decreasing the amount of pressure required, or in combination with all of these advantages.

Further objects of the invention will appear more fully hereinafter.

The invention consists substantially in the process of treating a container and its contents to sterilize the same, all as will be more fully herinafter set forth and finally pointed out in the appended claims.

In my two patents, above identified, I have illustrated and described in detail a process for treating canned goods for the purpose of sterilizing or preserving the same; and, while I referred therein and will refer herein, to canned goods, I wish it to be understood that by such expression I desire to include all such foods and food products as are today, or by my process are capable of being sterilized and preserved in a container, irrespective of whether it be glass, porcelain, tin or other material.

In said patents it is pointed out that my process comprises essentially the treatment of the product in the container under steam and pressure whereby the steam under pressure enters the can and passes through the entire contents thereof, the can thereafter being sealed with the steam under pressure still retained in the can.

As pointed out in the said patents, the amount of pressure, the temperature and the time of treatment vary in accordance with the nature and kind of food product being sterilized. Likewise, as pointed out in the said patents, it is preferable, if not essential, that the can, when processed, be placed in a position other than its top-side-up position.

It is among the special purposes of my present invention to provide an additional step prior to the sterilizing process which consists of creating a partial vacuum in the filled container to assist the steam under pressure in permeating through and agitating the contents of the container and thus perfect sterilization and have as a tendency the valuable advantage of enabling the reduction of the time of processing, amount of heat required and the amount of pressure required which, as above stated, are all controllable elements and to a certain extent vary in accordance with the products being treated.

I have discovered that by first subjecting the container and its contents to the action of vacuum, the time, heat and pressure required to effect thorough sterilization are all greatly reduced, for the reason that the vacuum created within the container and its contents greatly assists the pressure medium in penetrating throughout the entire mass of the contents of the container and agitating the same, and hence enables such pressure medium more quickly, thoroughly and efficiently to perform its sterilizing function.

In carrying out my invention, in one illustrative way, the container, after being filled with the product to be sterilized, is subjected to the action of a vacuum in a manner to retain a vacuum condition within the container. In practice it is customary, and desirable, in filling the container to leave a head space above the top of the contents with which the container is filled. I do not desire, however, to be limited or restricted in this respect, as it may be that a sufficient head space will result from the vacuumizing action. While the vacuum condition is maintained within the container, steam, or rather, pressure medium is supplied and the container is sealed while under pressure so as to retain the pressure medium within the container, as described and claimed in my patents above referred to.

A second simple way which may be utilized for carrying out my invention, and which is especially adapted for certain food products, is to heat the container with its product to approximately 100° F. to 200° F. (in accordance with the product treated) to expand the product and liquor surrounding the same, and to drive out the air. A partial cooling of the product thereafter will produce a partial vacuum, as will be well understood, which, of course, must be maintained within the container, as above explained.

I do not desire, therefore, to be limited or restricted to any specific manner of creating or applying the vacuum, or the pressure, nor to any particular means for automatically or otherwise closing and sealing the container after or during the application of the vacuum or the pressure medium. It will also be understood that in carrying out my present invention I am not to be limited or restricted with respect to whether the container is positioned top side up or bottom side up or in any intermediate position, although I have found it desirable and convenient to carry out the operations with the container in bottom side up position, at least while applying the pressure medium. In applying the vacuum, of course, the container should be positioned open end up to prevent the contents of the container escaping.

The vacuum condition within the container, as well as the pressure medium after the application of the latter, may be maintained therein in any suitable manner, as for instance by a suitable automatically closable cap or cover or valved cap.

From the foregoing description it will be seen that the essential feature of my invention is the step of vacuumizing the container and its contents before applying the sterilizing pressure medium.

I have found that by preliminarily vacuumizing the contents of the container, as above described, a greatly increased and violent agitation is created within the mass of such contents when the pressure medium is supplied, and the action of the heat of the pressure medium is greatly intensified, and herein lies a large part of the practical value of my discovery.

Having now set forth the objects and nature of my invention, and having described the practical operation thereof, what I claim as new and useful and of my own invention, and desire to secure by Letters Patent is:

1. In the process of sterilizing canned goods by subjecting the contents of the can to steam under pressure, and sealing the steam under pressure within the can, the step of vacuumizing the can and its contents.

2. In the process of sterilizing canned goods by subjecting the contents of the can to steam under pressure, and sealing the steam under pressure within the can, the step of preliminary heating the can and its contents to drive off the air in the can, products and liquor surrounding the products to form a partial vacuum.

In testimony whereof I have hereunto set my hand on this 25th day of May A. D., 1923.

WILLIAM B. FENN.